Figure 1:
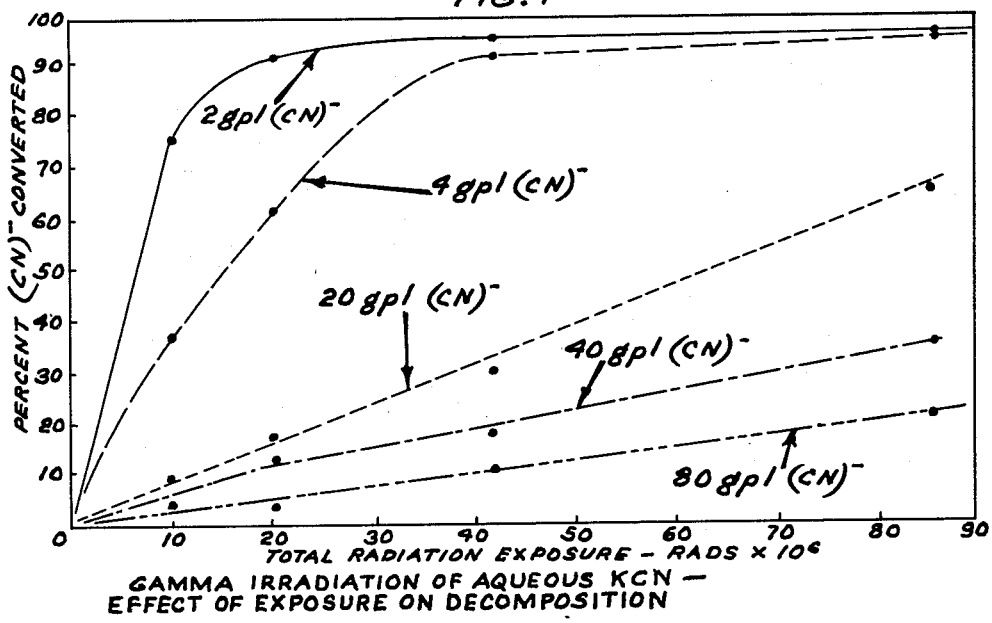

GAMMA IRRADIATION OF AQUEOUS KCN —
EFFECT OF EXPOSURE ON DECOMPOSITION

GAMMA IRRADIATION OF AQUEOUS KCN —
EFFECT OF CONCENTRATION ON DECOMPOSITION

INVENTORS
R. F. BYRON
J. DANACZKO, JR.
A. L. DIXON
L. M. WELKER
BY
J. L. Landis
ATTORNEY

3,147,213
RADIATION DECOMPOSITION OF WASTE CYANIDE SOLUTIONS
Richard F. Byron, Naperville, John Danaczko, Jr., Oak Park, and Alfred L. Dixon, Western Springs, Ill., and Lloyd M. Welker, Worthington, Ohio, assignors to Western Electric Company, Incorporated, a corporation of New York
Filed July 11, 1961, Ser. No. 123,159
5 Claims. (Cl. 210—1)

The present invention relates generally to methods of treating waste solutions containing cyanide ions to render them safe for disposal, and more particularly to the decomposition of cyanide ions contained in aqueous solutions into harmless constituents by exposure to penetrative ionizing radiation. Accordingly, the general objects of the invention are to provide new and improved methods of such character.

In various industrial operations, especially many electroplating processes, waste solutions containing cyanide ions must be disposed of. The disposal of such cyanide ions in spent solutions presents a very acute problem because of the toxicity of such solutions to animal and marine life. Regulatory laws require that all cyanide wastes be partially or substantially completely decomposed before they may be discharged into natural streams or other customary solution disposal facilities. In the past, the cyanides have usually been decomposed by purely chemical methods, such as oxidation with chlorine. Such methods, however, have proven to be rather troublesome in many respects, particularly in that a great deal of time is involved and there is a further health hazard introduced by the handling and disposal of chlorine.

Accordingly, a more specific object of the invention is to provide certain simple and efficient radiation methods of decomposing cyanide ions contained in solutions into substantially harmless constituents, well within the limits imposed by regulatory laws, which methods do not require extended processing time or facilities.

With the foregoing and other objects in view, a method illustrating certain features of the invention may include the step of exposing cyanide ions contained in waste solutions to penetrative ionizing radiation, preferably gamma radiation, until the cyanide ions have been decomposed into nontoxic constituents to that degree required for safe disposal, after which the treated solution may be discharged into native streams and the like. In general, best results are obtained by diluting relatively concentrated solutions down to a cyanide ion $(CN^-)$ concentration at least as low as about 1 to 5 grams per liter prior to exposure.

The principal waste solutions under consideration are those spent electroplating solutions and rinsing solutions which contain cyanide salts in aqueous solution such as are commonly employed in electroplating zinc, copper, cadmium, silver, gold and other metals, as well as mixtures of several metals. In practicing the invention, such solutions are exposed either on a batch or a continuous basis to gamma radiation, which serves to rupture the $C \equiv N$ triple bond and thereby convert the cyanide ions into harmless byproducts such as are customarily discharged to the atmosphere and into native streams.

While the reactions involved are not fully understood, and may vary to a degree from one solution to another depending partly on other constituents present in the solution, particularly alkali metal hydroxides normally used in cyanide plating solutions, the cyanide ions are broken down primarily into ammonia, carbon dioxide, and the various corresponding hydroxides and carbonates. These materials are ordinarily suitable for discharge in dilute form to the atmosphere and into streams. No harmful radioactivity was present in the treated solutions which are discharged.

EXAMPLE I

According to one specific illustrative example of the invention, a set of potassium cyanide sample solutions were prepared containing 2, 4, 20, 40, and 80 grams per liter of cyanide ion, $(CN)^-$, which were exposed to gamma-radiation averaging 0.75 mev. from cooling reactor fuel rods. A 25 milliliter sample of each solution was exposed to total dosages of $10.2 \times 10^6$, $20.5 \times 10^6$, $42.2 \times 10^6$ and $85.9 \times 10^6$ rads (a dosage of one rad being defined as 100 ergs per gram of absorbed radiation). The conversion figures for each solution and exposure are tabulated below in "Table I," and are represented graphically in FIGS. 1 and 2.

*Table I*
RESULTS OF GAMMA RADIATION OF AQUEOUS KCN SOLUTION

| Cyanide as $(CN)^-$ Concentrations, g.p.l. | | Exposure, rads | | Percentages of $(CN)^-$ Converted |
|---|---|---|---|---|
| Initial | Final | Per Minute | Total | |
| 2 | 0.52 | | $10.2 \times 10^6$ | 75 |
| 4 | 2.48 | | | 37 |
| 20 | 17.40 | $1.02 \times 10^4$ | | 09 |
| 40 | 38.00 | | | 04 |
| 80 | 78.20 | | | 03 |
| 2 | 0.20 | | $20.5 \times 10^6$ | 91 |
| 4 | 1.56 | | | 61 |
| 20 | 15.80 | $2.04 \times 10^4$ | | 18 |
| 40 | 34.30 | | | 13 |
| 80 | 77.00 | | | 04 |
| 2 | 0.10 | | $42.2 \times 10^6$ | 95 |
| 4 | 0.31 | | | 92 |
| 20 | 13.52 | $0.96 \times 10^4$ | | 30 |
| 40 | 32.30 | | | 18 |
| 80 | 71.40 | | | 11 |
| 2 | 0.10 | | $85.9 \times 10^6$ | 95 |
| 4 | 0.21 | | | 95 |
| 20 | 6.76 | $1.83 \times 10^4$ | | 65 |
| 40 | 25.55 | | | 35 |
| 80 | 63.50 | | | 21 |

These data, and other data collected in tests of a similar nature, indicate (FIG. 1) that the percentage decomposition increates more-or-less directly with the total radiation dosage up to conversions of approximately 90 to 95%, after which markedly increased dosages are required to produce further increased decomposition yields. While substantially complete conversion can be obtained for all concentrations with sufficient exposure, a determination of the optimum dosage for each individual application depends on the initial concentration, the degree of predilution desirable, the percentage or absolute conversion required, and such other factors as the presence of extraneous constituents in the solution. However, total dosages between about $10^6$ to $10^9$ rads appear to be effective over a wide range of solutions and concentrations with the lower dosages corresponding to the more dilute solutions.

Figure 2:
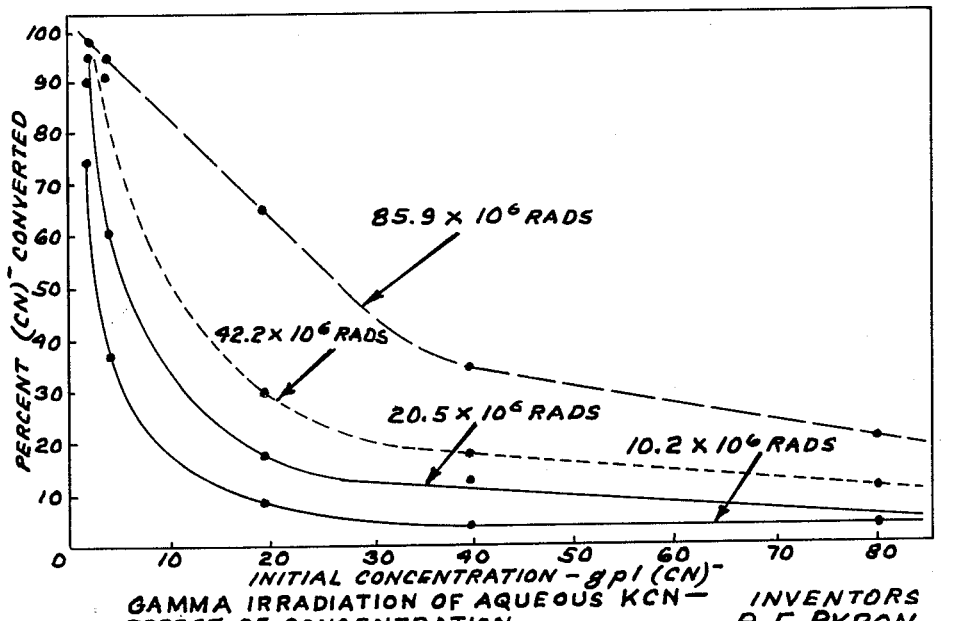

As indicated by the data presented in Table I, and graphically in FIG. 2, the relatively dilute solutions (between about 1 and 5 g.p.l. of cyanide ion) require far less total dosage to accomplish a given conversion. Therefore, it is preferred to dilute strong solutions (such as 20 g.p.l. of cyanide ion or more) down to the range of about 1 to 5 g.p.l. prior to radiation so as to take advantage of the highly increased yield indicated by the left-hand portions of the family of curves shown in FIG. 2.

EXAMPLE II

Various samples of spent zinc electroplating solutions were irradiated in the same manner, both undiluted and prediluted, with generally similar results. Thus, substantially complete conversion can be obtained at all concentrations, with the more dilute solutions requiring less total exposure to accomplish a given percentage conversion. As a specific example, a typical solution containing the following constituents was subjected to a total dosage of about $10^9$ rads, and 95% conversion was achieved:

| | G.p.l. |
|---|---|
| Zinc cyanide, $Zn(CN)_2$ | 68 |
| Sodium cyanide, NaCN | 53 |
| Sodium hydroxide, NaOH | 90 |
| Total cyanide, $(CN)^-$ | 58 |

However, when this same solution was diluted down to 2 g.p.l. total cyanide ion concentration, only $83.6 \times 10^6$ rads were required for 95% conversion.

Examples of other typical electroplating solutions which may be decomposed in accordance with the methods of the invention as outlined hereinbefore are as follows:

| | G.p.l. |
|---|---|
| (A) Gold plating solution: | |
| $KAu(CN)_3$ | 18.75 |
| KCN | 45.0 |
| KOH | 3.75 |
| (B) Silver plating solution: | |
| AgCN | 15.0 |
| NaCN | 52.5 |
| (C) Copper plating solution: | |
| CuCN | 41.2 |
| NaCN | 26.2 |
| NaOH | 26.0 |
| (D) Cadmium plating solution: | |
| $Cd(CN)_2$ | 27.0 |
| NaCN | 127.0 |
| NaOH | 22.4 |
| (E) Brass plating solution: | |
| CuCN | 26.2 |
| $Zn(CN)_2$ | 11.3 |
| NaCN | 7.5 |
| (F) Typical rinse solution: | |
| NaCN | 30 |
| NaOH | 30 |

The intensity and time period of irradiation are not particularly critical, independently, but correlation between the two must be maintained to obtain the total dosage necessary to decompose the cyanide constituents to the required extent; for example, 95 to 98%. Thus, the radiation source may be selected in accordance with availability and expense, and the time varied to suit the specific situation.

The foregoing general description and specific examples illustrate the application of the invention to provide a new solution to the troublesome problem involved in treating waste solutions containing cyanide ions so as to render them safe for disposal by the normal channels through which waste products are discharged by industrial plants.

While certain specific examples of the invention have been described in detail hereinabove, it will be obvious that various modifications may be made from the specific details described without departing from the spirit and scope of the invention.

What is claimed is:

1. The method of treating waste solutions containing cyanide ions so as to render such solutions safe for disposal, which comprises the step of exposing such solutions to penetrative ionizing radiation until the cyanide ions have been decomposed into nontoxic constituents to that degree required for safe disposal.

2. The method of treating waste solutions having cyanide ion concentrations greater than about 20 g.p.l. to render them safe for disposal, which comprises the steps of diluting such solutions to a cyanide ion concentration of the order of 1 to 5 g.p.l., and then exposing such diluted solutions to penetrative ionizing radiation until the cyanide ions have been decomposed into nontoxic constituents to that degree required for safe disposal.

3. The method of treating spent, aqueous electroplating solutions containing cyanide ions to render such solutions safe for disposal, which comprises the step of exposing such solutions to gamma radiation until the cyanide ions contained therein have been substantially completely decomposed into nontoxic constituents.

4. The method as recited in claim 3, wherein the total dosage of gamma radiation is of the order of about $10^6$ to $10^9$ rads.

5. The method as recited in claim 3, wherein the solution is an alkaline, cyanide electroplating solution for a metal selected from the group consisting of zinc, copper, cadmium, silver, and gold; and wherein the solution is prediluted to a cyanide ion concentration of 1 to 5 g.p.l. prior to radiation.

References Cited in the file of this patent

UNITED STATES PATENTS 2,981,682    Lancy _____ Apr. 25, 1961

OTHER REFERENCES

"Use of Radiation to Promote Chemical Reactions," Martin, Chem. and Eng. News, vol. 33, Apr. 4, 1955, pp. 1424–1428.

"Ionizing Radiations," Chemical Engineering, September 1957, pages 235–241.

Journal of Chemical Physics, vol. 25, November 5, page 1084, November 1956.